Aug. 23, 1960
J. H. FIELD ET AL
2,949,776
SLIP-TUBE GAUGE
Filed Sept. 4, 1956
3 Sheets-Sheet 1
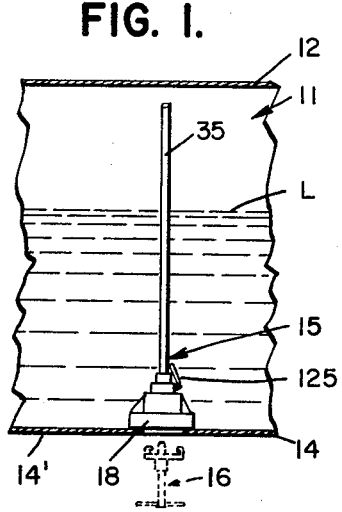
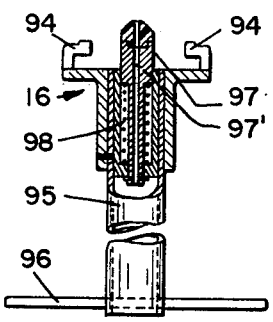
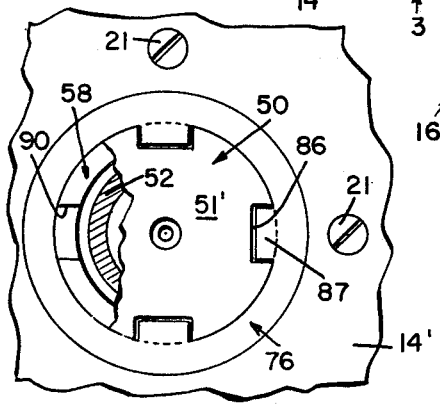
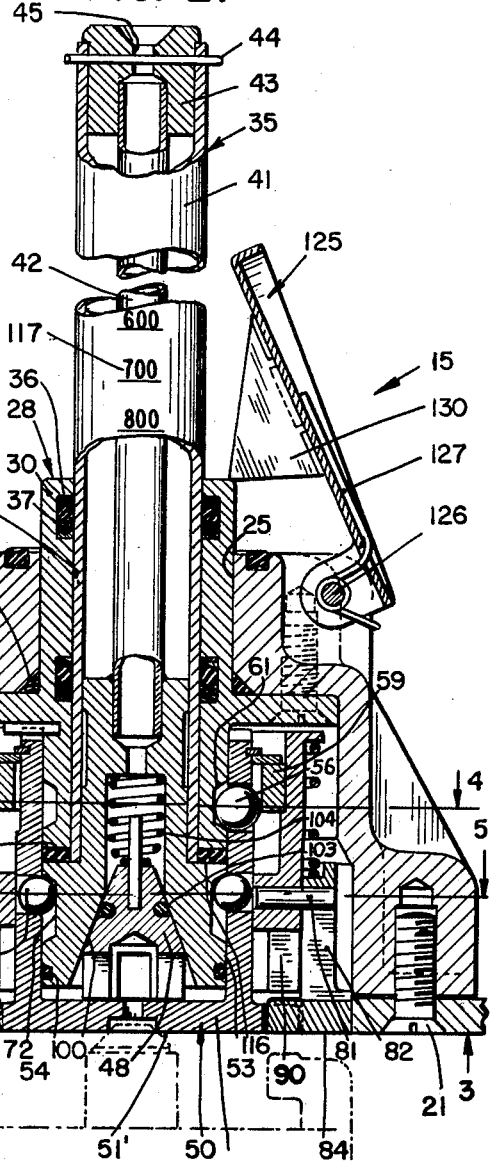
INVENTOR
JAMES H. FIELD
CLARENCE L. VOGT
BY
Mason & Graham
ATTORNEYS Aug. 23, 1960

J. H. FIELD ET AL 2,949,776

SLIP-TUBE GAUGE

Filed Sept. 4, 1956

INVENTOR
JAMES H. FIELD
CLARENCE L. VOGT
BY

*Mason & Graham*

ATTORNEYS

Aug. 23, 1960 J. H. FIELD ET AL 2,949,776
SLIP-TUBE GAUGE
Filed Sept. 4, 1956 3 Sheets-Sheet 3

INVENTOR
JAMES H. FIELD
CLARENCE L. VOGT
BY
*Mason & Graham*
ATTORNEYS

United States Patent Office 2,949,776
Patented Aug. 23, 1960

2,949,776
SLIP-TUBE GAUGE

James H. Field and Clarence L. Vogt, Burbank, Calif., assignors to Roylyn Incorporated, Glendale, Calif., a corporation of California Filed Sept. 4, 1956, Ser. No. 607,620

14 Claims. (Cl. 73—290)

This invention has to do with means for accurately determining the liquid level in a tank or container from the underside thereof.

An object of the invention is to provide a novel gauge means for obtaining an accurate indication of the level of liquid in a tank which embodies a tube normally housed in the tank but capable of being withdrawn through the lower wall of the tank, the tube preferably being provided with indicia, and, when withdrawn, being open-ended to permit seepage of liquid therethrough when the upper end of the tube is brought to the level of the liquid in the tank.

Another object is to provide in such a gauge sealing means external to the tube which permits the tube to be moved axially in and out through the lower wall of the tank without loss of liquid from the tank. A further object in this connection is to provide sealing means internal to the tube which seals the tube against fluid loss when the gauge is not in use.

Still another object is to provide novel means for locking the tube and associated structure in its retracted or fully housed position so that it may be safely used under all conditions.

Another object is to provide a device of the type indicated which can be mounted in the lower wall of a tank or the like and when in fully housed or retracted position presents a flush external surface in the plane of the outer surface of the tank wall in which it is mounted thereby enabling the device to be used on aerodynamic surfaces of aircraft such as for the purpose of gauging the contents of wing tanks of aircraft.

A still further object is to provide a device of the type indicated in which the gauge tube and associated assembly may be removed from its installed position in the tank without loss of liquid from the tank for the purpose of inspection or repair and replacement of parts. In this connection it is an object to provide a trap door cover or valve which automatically closes when the tube assembly is removed from its mounting in the lower wall of the tank.

A further object is to provide a gauge device which is so constructed that it can be operated by a suitable tool from a remote point below it.

These and other objects will be apparent from the drawings and the following description.

Referring to the drawings:

Fig. 1 is a fragmentary sectional view of a tank having liquid therein and provided with a gauge device embodying the invention mounted on the lower wall of the tank, the device being shown in elevation;

Fig. 2 is an enlarged fragmentary vertical sectional view through the device of Fig. 1 in the plane indicated by the lines 2—2 of Figs. 4 and 5;

Fig. 3 is an inverted plan view on line 3—3 of Fig. 2;

Fig. 9 is a sectional view showing a tool suitable for use in operating the gauge mechanism.

Figure 4:
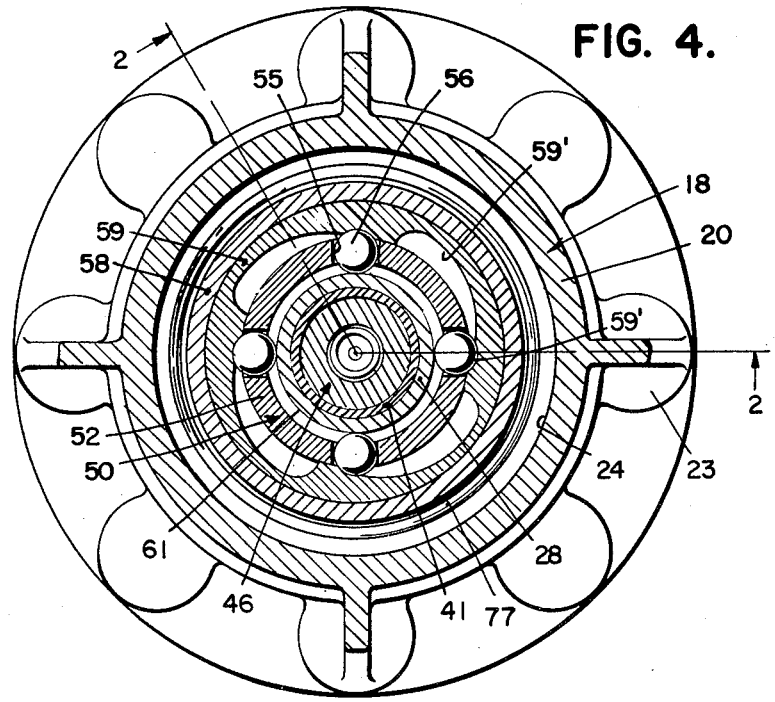
Figs. 4 and 5 are sectional views on lines 4—4, 5—5, respectively, of Fig. 2.
Figure 5:
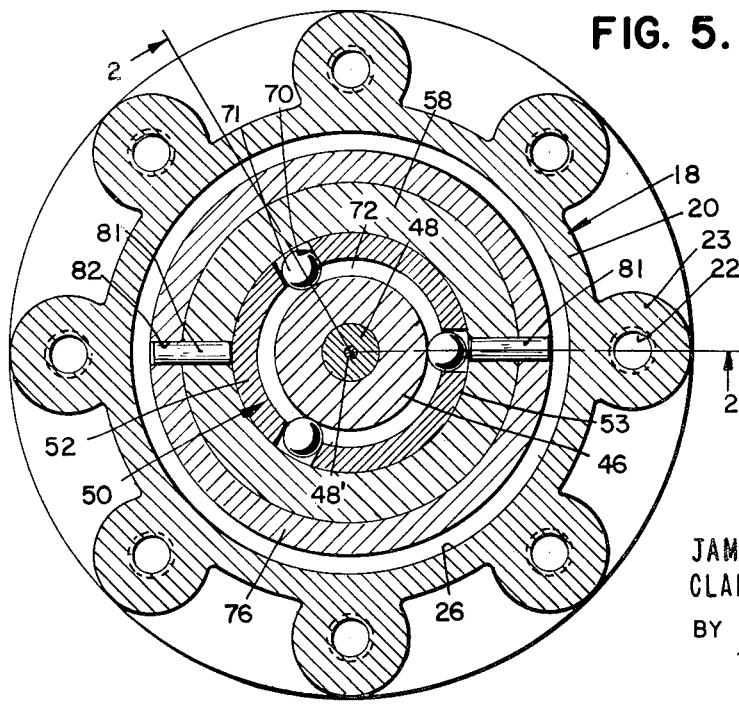

More particularly describing the invention, in Fig. 1 we show fragmentarily a tank or container 11 having liquid L therein. The upper wall of the tank is designated by 12 and the lower wall by 14. The tank may well be an airplane wing tank and the lower surface 14', the lower surface of the wing. The device of the invention is shown mounted in or upon the lower wall of the tank and extending upwardly therein, the device being designated generally by numeral 15. Immediately below the tank is shown a tool 16 for operating the device.

Referring now to Figs. 2 to 8 for a more detailed description of the gauge device, we provide a housing 18 which has a body 20 mounted upon the lower wall 14 of the tank by means of screws 21 received in threaded bores 22 provided in bosses 23.

Member 20 provides a central or intermediate bore 24, an inner bore 25 and an outer bore or counterbore 26. Secured in the housing is a slip-tube or gauge tube bushing designated generally 28, which has a cylindrical body 30 provided with a flange 31. The flange is secured against the face 32 at the inner end of the bore 24 by screws 33 which extend into the housing body 20. A portion of the body 30 of the bushing 28 extends through the bore 25 of the housing 18 and projects therebeyond.

A slip-tube or gauge tube assembly, designated generally 35, is slidably mounted in the bushing 28. To insure against leakage of fluid between the parts, a pair of axially spaced seal rings 36 are provided in grooves 37 in the bushing. A seal ring 39 is provided between the housing 18 and bushing 28.

The slip-tube assembly includes an outer tube 41 within which is mounted an inner tube 42. The latter is anchored at its upper or inner end in an inner plug 43 mounted in tube 41. A pin 44 extends diametrically through the parts and projects beyond the outer tube. The plug 43 has a passage 45 providing a continuation of the passage through tube 42.

At the lower and outer end of the tube assembly is an outer plug 46 which is shown as welded at 47 to the inner tube 42. This plug 46 carries a valve member 48 which will be more fully described later, the purpose of the valve being to effect a closure of the lower end of tube 42 when the tube assembly is retracted or in its uppermost position.

Surrounding plug 46 is a ball cage 50 which includes a flat circular outer wall 51 and a cylindrical wall 52. The latter is slidably and rotatably mounted with respect to the periphery 53 of the plug 46 and the outer portion of bushing 28. A seal 54 is provided between plug 46 and the cage. The latter has four openings 55 in which are received balls 56. Surrounding the ball cage and rotatable with respect thereto is a collar 58 which includes a cam ring 59 having cam surfaces 59' and 59" (Figs. 4 and 8) for the purpose of moving balls 56 radially inwardly when the collar is turned in the appropriate direction. When the parts are in locked position (Figs. 2 and 4) balls 56 extend into a peripheral groove 61 in the body 30 of bushing 28, serving to lock the parts against axial movement.

Cam member 59 is held in place in a counterbore portion 63 of member 58 by a washer 64 and snap ring 65, the latter being received in a groove 66 in the cage member. The collar 58 is also provided with bored portion designated 67.

The ball cage is also provided with three openings 70 to receive balls 71, the balls projecting into a peripheral groove 72 in the outer plug 46. This construction limits the relative axial movement between the cage 50 and outer plug 46.

Surrounding the member 58 is a lock ring 76. A spring 77 between the inner end of this member and a flange 78 on the collar serves to yieldably urge the lock ring outwardly of the assembly. The lock ring is keyed to the collar to prevent relative rotation of the parts by means of two pins 81 mounted in the collar and projecting radially into axial slots 82 respectively in the lock ring.

The lock ring is formed with a flat outer surface 84 which is adapted to lie in the same plane as the outer surface 14' of lower wall 14 of the container or tank and in the same plane or flush with the outer surface 51' of ball cage 50 when the parts are retracted and locked (Fig. 2). The ball cage wall 51 is provided with a plurality of peripheral radial extending recesses 86 of which four are shown. These accommodate four fingers or radial projections 87 upon the lock ring. Immediately above the projections on the lock ring, the collar 58 is provided with four axially extending slots 90 which register with and are sufficiently large to accommodate fingers 87. When the parts are in the position in which they are shown in Figs. 2 and 3, there can be no relative rotation between the lock ring and the collar due to the interengagement of the fingers 87 with the ball cage. To prevent rotation of the ball cage relative to housing 18, the inner end of the cage is provided with a series of teeth or recesses 92 for engagement with a pin 93 mounted in bushing 28.

Figure 6:
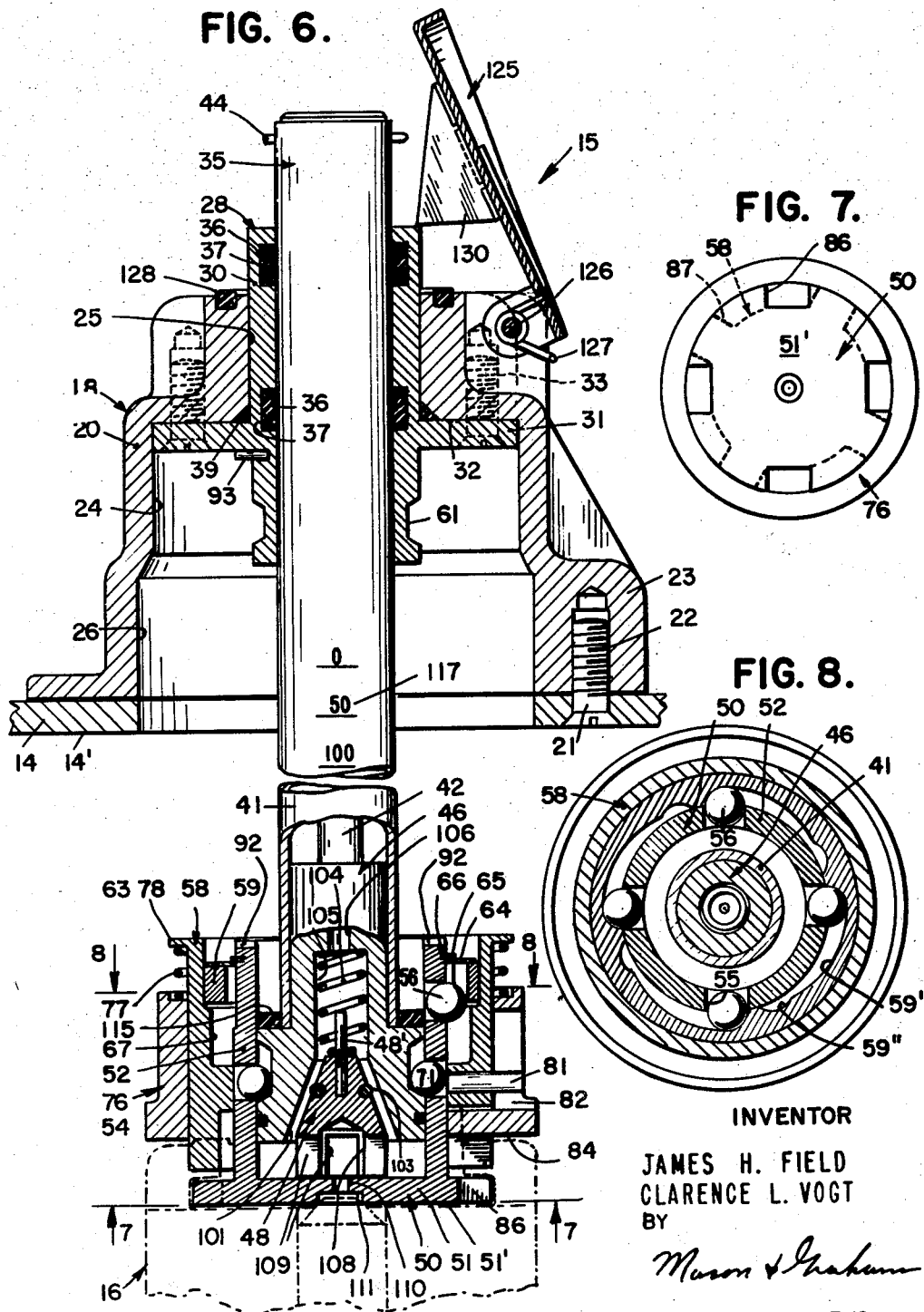
Fig. 6 is a view in the same plane as Fig. 2 but showing the parts in a different position, namely, with the slip-tube assembly and associated parts partially withdrawn from the tank.
Figure 7:
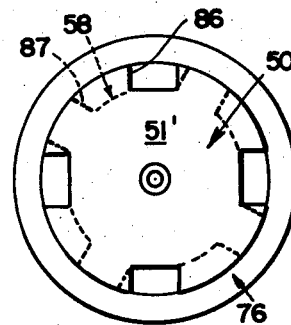
Fig. 7 is an inverted plan view on line 7—7 of Fig. 6.
Figure 8:
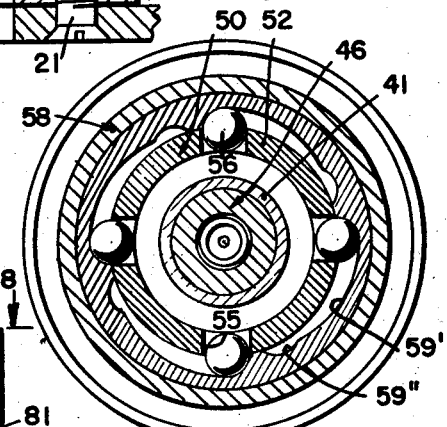
Fig. 8 is a cross-sectional view on line 8—8 of Fig. 6.

In order to release the device it is necessary to use a tool 16 or the like (Fig. 9) having claws 94 of a size to enter recesses 86 in the ball cage for the purpose of raising the lock ring 76 to the position in which it is shown in Fig. 6. The claws then are received in the slots 90 of the collar 58 and can be used to rotate the collar to a position which will permit of the locking balls 56 moving radially outward of the groove 61 in the bushing 28. The entire tube assembly may then be pulled down or extended as shown in Fig. 6.

The tool 16 may comprise a hollow stem 95 with a handle 96 at one end and the claws 94 at the other. An axially movable guide pin 97, with a passage 97' therethrough, is mounted in the stem and biased outwardly by a spring 98.

As previously indicated a valve 48, having a stem 48', is provided in plug 46. This is shown as frusto-conical and is received in a flared section 100 of a passage 101 through the plug. The valve carries a seal ring 103. A spring 104 in a bore 105 serves to urge the valve to open position. Above the bore 105 is a smaller bore 106 which communicates with the interior of tube 42. The lower end of valve 48 is centrally bored at 108 and provided with axial slots 109. Immediately below the valve and in axial alignment therewith is a passage 110 and counterbore 111 in the wall 51 of cage 50.

When the parts are fully retracted and locked as shown in Fig. 2, the valve 48 is abutted by wall 51 of the cage and thereby held upon its seat against the action of spring 104, closing passage 101 through plug 46. A rubber gasket 115 is interposed between face 116 of plug 46 and the lower end of the bushing 28 so that the fit of the parts is not critical. The gasket 115 exerts a spring action and also provides additional locking load on the ball 56 maintaining them against the cam face 59'. When the parts are unlocked and the assembly partially withdrawn from the housing 18, the ball cage is moved outwardly relative to the plug 46 to the position of Fig. 6 thereby permitting the valve to be forced open.

In the operation, as previously explained the device is normally housed in the tank as shown in Fig. 1. When it is desired to determine the liquid level in the tank, a suitable tool such as that designated 16 is used to unlock the device and pull the tube assembly and associated parts downwardly as shown in Fig. 6. In use the guide pin 97 of the tool is first inserted in the counterbore 111 of the cage, after which claws 94 are used to unlock the device by raising lock ring 76 and rotating collar 58. When the tube assembly has been drawn down to the point where the upper end of the tube is approximately level with the liquid L in the tank, seepage occurs through inner tube 42 and the tool. Suitable calibrated indicia may be provided on the outer tube 38, such as that indicated by the numeral 117, so as to indicate the amount of liquid in the tank. The indicia will be graduated and numbered in accordance with the particular tank. After a reading has been taken, the device is locked in place by returning it to its position of Fig. 2 or fully retracted position and manipulating the tool to rotate the locking members into place.

One of the features of the invention is the fact that the entire assembly may be withdrawn from the tank which may be the wing tank of an airplane for repair or inspection without loss of any appreciable amount of fluid. In this connection it should be noted that the pin 44 limits outward movement of the tube assembly. However, by removing the screws 33 which serve to anchor or mount the bushing 28 in the housing, the latter may be removed permitting the entire assembly to be withdrawn. As the bushing 28 and tube 38 are withdrawn from the tank the opening through housing 18 is closed by a cover member 125 hingedly mounted at 126 and urged to closed position by a spring 127. This seats upon an annular seal ring 128 at the upper end of housing 18 effecting a seal. It should be noted that the cover has a triangular shaped projection 130 on its underside which normally rests upon the inner or upper end of bushing 28 serving to hold the same open or in the position of Fig. 6.

Although we have illustrated and described a preferred form of our invention, we contemplate that various changes and modifications can be made therein without departing from the invention, the scope of which is indicated by the following claims.

We claim:

1. A gauge for determining the liquid level in a container having an aperture in the lower wall thereof, comprising a tubular housing means mounted on the inside of the lower wall of the container, a gauge tube assembly mounted for axial movement vertically within the housing means, said tube assembly including an open-ended tube projecting upwardly in the container, and a valve for closing said tube, locking means carried by said tube assembly and cooperating with said housing for releasably holding said tube assembly in fully retracted position, and interengaging means on said tube assembly and said locking means, effective, when said tube is locked in retracted position, for closing said valve, said locking means comprising a cylindrical cage, a plurality of locking members movably mounted in said cage to project therefrom for engagement, when projected, with said housing means, a collar associated with said cage and having cam means for projecting said locking members in response to rotative movement of said collar in one direction, a lock ring carried by said lock ring being keyed to said collar, interengaging means on said cage and lock ring preventing relative rotation thereof when said lock ring is in a given position but permitting relative rotation when said lock ring is not in said position, and means yieldably urging said lock ring axially to said position.

2. A gauge for determining the liquid level in a container having an aperture in the lower wall thereof, comprising a tubular housing means mounted on the inside of the lower wall of the container about the aperture therein, a gauge tube assembly mounted for axial movement vertically within the housing means, said tube assembly including an open-ended tube projecting upwardly in the container, a valve for closing said tube, a tubular cage carried by said tube assembly, a plurality of locking members mounted in said cage for movement to project therefrom for engagement, when projected, with said housing, a collar associated with said cage and having cam means for projecting said locking members in response to rotative movement of said collar in one direction, a lock ring carried by said collar and mounted for limited axial movement thereon, said lock ring being keyed to said collar, interengaging means on said cage and lock ring preventing relative rotation thereof when said lock ring is in a given position, and means yieldably urgng said lock ring to said given position.

3. A gauge as set forth in claim 2 in which said lock ring and said cage, when said tube assembly is retracted and locked, present outer surfaces flush with the outer surface of said container.

4. In a device having a tubular housing and a member mounted in the housing for axial movement relative thereto, means for releasably locking said member against axial movement, comprising a cylindrical cage, a plurality of locking members movably mounted in said cage to project from the cage for engagement, when projected, with said housing means, a collar associated with said cage and having cam means for projecting said locking members in response to rotative movement of said collar in one direction, a lock ring carried by said collar and mounted for limited axial movement thereon, said lock ring being keyed to said collar, interengaging means on said cage and lock ring preventing relative rotation thereof when said lock ring is in a given position but permitting relative rotation when said lock ring is not in said given position, and means yieldably urging said lock ring to said position.

5. A device as set forth in claim 4 in which said lock ring and said cage, when said member is housed, normally present flat, coplanar outer surfaces.

6. In a device having a tubular housing and a member mounted in the housing for axial movement relative thereto, means for releasably locking said member against axial movement, comprising a cage having a cylindrical body mounted for rotation on said member, said housing including a peripherally grooved cylindrical section received in the inner end of said cage, a plurality of locking members movably mounted in said cage for projection therefrom radially inward into the groove of said housing section, a collar surrounding said cage and rotatable with respect thereto, said collar having cam means for projecting said locking members in response to rotative movement of said collar in one direction, a lock ring mounted on said collar for limited axial movement thereon, means preventing relative rotation of said lock ring and collar, spring means between said lock ring and collar urging said lock ring to a given position, interengaging means on said cage and said lock ring effective, when said lock ring is in said given position, to prevent relative rotation thereof, and interengaging means effective, when said cage is housed in said housing, to prevent rotation of said cage relative to said housing means.

7. In a gauge for determining the liquid level in a container having an aperture in the lower wall thereof, a housing mounted on said lower wall and projecting therefrom into the container, a tube mounted in said housing for axial movement relative thereto, a plug at the outer end of said tube, said plug having a passage therethrough including a valve seat, a valve in said passage, spring means in said plug urging said valve outwardly of the plug to an open position, a cage mounted on said plug for limited axial movement relative thereto, said cage having an apertured wall engaging the outer end of said valve, means for releasably securing said cage to said housing in a position such that said cage serves to hold said valve in closed position.

8. In a gauge embodying a tubular housing, gauge tube means in the housing comprising an outer tube mounted in the housing for axial movement relative thereto, an inner tube within said outer tube, means closing the annular space between said tubes, said means including a plug at the outer end of said tubes and projecting beyond the tubes, said plug having a passage therethrough providing a continuation of the passage through said inner tube, valve means in said passage of said plug, means urging said valve means to open position, and means for releasably securing said tube means to the housing in a given position with respect thereto, said means including a part engageable with said valve means and effective to move said valve to a closed position when the parts are locked.

9. In a gauge for determining the liquid level in a container having an aperture in the lower wall thereof, a tubular housing mounted upon the inner side of said wall surrounding said aperture, a bushing detachably secured in said housing and having an outwardly projecting section with a peripheral groove therein, a tube mounted in said bushing for axial movement therein, an inner tube within said outer tube, a plug at the outer end of said outer tube closing the annular space between said inner and outer tubes and having a passage therethrough forming a continuation of the passage through said inner tube, said passage in said plug having a valve seat, a valve mounted in said passage in said plug for engagement with said valve seat to close said passage, said valve projecting beyond said plug at its outer end, spring means yieldably urging said valve outwardly of said plug, a cage mounted on and surrounding said plug, said cage being mounted for limited axial movement upon said plug, said cage in part surrounding the grooved section of said bushing, locking members carried by said cage, a collar mounted upon said cage for rotation relative thereto, cam means carried by said collar engageable with said locking members and effective upon rotation of said collar in one direction to cause said locking members to project from said cage into the groove in said section of said bushing, a lock ring carried upon said collar and keyed thereto for limited axial movement relative thereto, spring means between the collar and the lock ring urging said lock ring to a given position, and interengaging means upon said cage and said lock ring effective, when said lock ring is in said given position, to prevent relative rotation thereof, said cage having an outer wall abutting the outer end of said valve, said cage being effective, when secured to said section of said bushing in locked position, to hold said valve upon said seat and close the passage through said plug.

10. A gauge for determining the liquid level in a container having an aperture in a lower wall thereof, comprising a tubular housing mounted on the apertured lower wall of the container about the aperture therein, an open-ended gauge tube mounted in said housing for axial movement relative thereto, said gauge tube being open to the interior of the container only through its upper end, a valve at the outer end portion of said gauge tube controlling the opening therethrough, means yieldably urging said valve to open position, and means for releasably securing said tube to the housing in retracted position, said means including a part engageable with said valve and effective to move said valve to a closed position when the parts are secured.

11. A gauge for determining the liquid level in a container having an aperture in a lower wall thereof, comprising a tubular housing mounted on the apertured lower wall of the container about the aperture therein, an open-ended gauge tube mounted in said housing for axial movement relative thereto, said gauge tube being open to the interior of the container only through its upper end, locking means engageable with said housing and said tube for detachably securing said tube in retracted position within said container, said locking means including a part covering the lower end portion of said tube, said part having an opening therein below the lower end of said tube thereby providing a direct open fluid passageway from the tube down through said part to the exterior of said gauge, and a valve controlling the opening through the tube, said valve being open except when restrained by said locking means when the latter is in locked position.

12. A gauge for determining the liquid level in a container having an aperture in a lower wall thereof, comprising a tubular housing mounted on the inside of said container against the lower wall thereof and about said aperture, a gauge tube mounted in said housing for axial movement relative thereto, locking means engageable with said housing carried by the outer end portion of said tube for releasably securing said tube in retracted position, said locking means and said outer end portion of said tube being received within said housing when said tube is retracted and said locking means presenting a flat outer surface flush with the lower surface of the lower wall of the container, a valve controlling the passage through said tube, and means urging said valve to open position, said locking means including a portion engageable with said valve to close the same when the locking means is secured in said housing.

13. A gauge for determining the liquid level in a container having an aperture in a lower wall thereof, comprising a tubular housing mounted on the apertured wall of the container about the aperture therein, a bushing within said housing, means detachably securing said bushing to said housing, said means being accessible from the exterior of said container through the outer end portion of said housing, a gauge tube mounted for axial movement in said bushing and normally projecting upwardly a substantial distance above said housing within the container, said tube being open to the interior of said container only through its upper end, means carried in part by said housing and in part by said tube for releasably locking said tube in fully upward, retracted position, and means operable when said tube is fully retracted to prevent escape of fluid from the container to the exterior through said tube, said means being ineffective when said tube is extended below the container.

14. A gauge as set forth in claim 13 in which said housing is provided with a spring-actuated cover at its inner end within said container normally held open by said bushing, effective, upon removal of the bushing and gauge tube from the housing, to close said housing against escape of fluid therethrough from the container.

References Cited in the file of this patent

UNITED STATES PATENTS

| | | |
|---|---|---|
| 368,441 | Baker | Aug. 16, 1887 |
| 2,186,924 | Hooper | Jan. 9, 1940 |
| 2,522,258 | Fanshier | Sept. 12, 1950 |
| 2,614,426 | Darlington | Oct. 21, 1952 |
| 2,783,644 | Willis | Mar. 5, 1957 |